Aug. 19, 1924.
W. SCHWEIZER
DEVICE FOR EQUALIZING CRANK PIVOTS
Filed Oct. 23, 1922
1,505,167
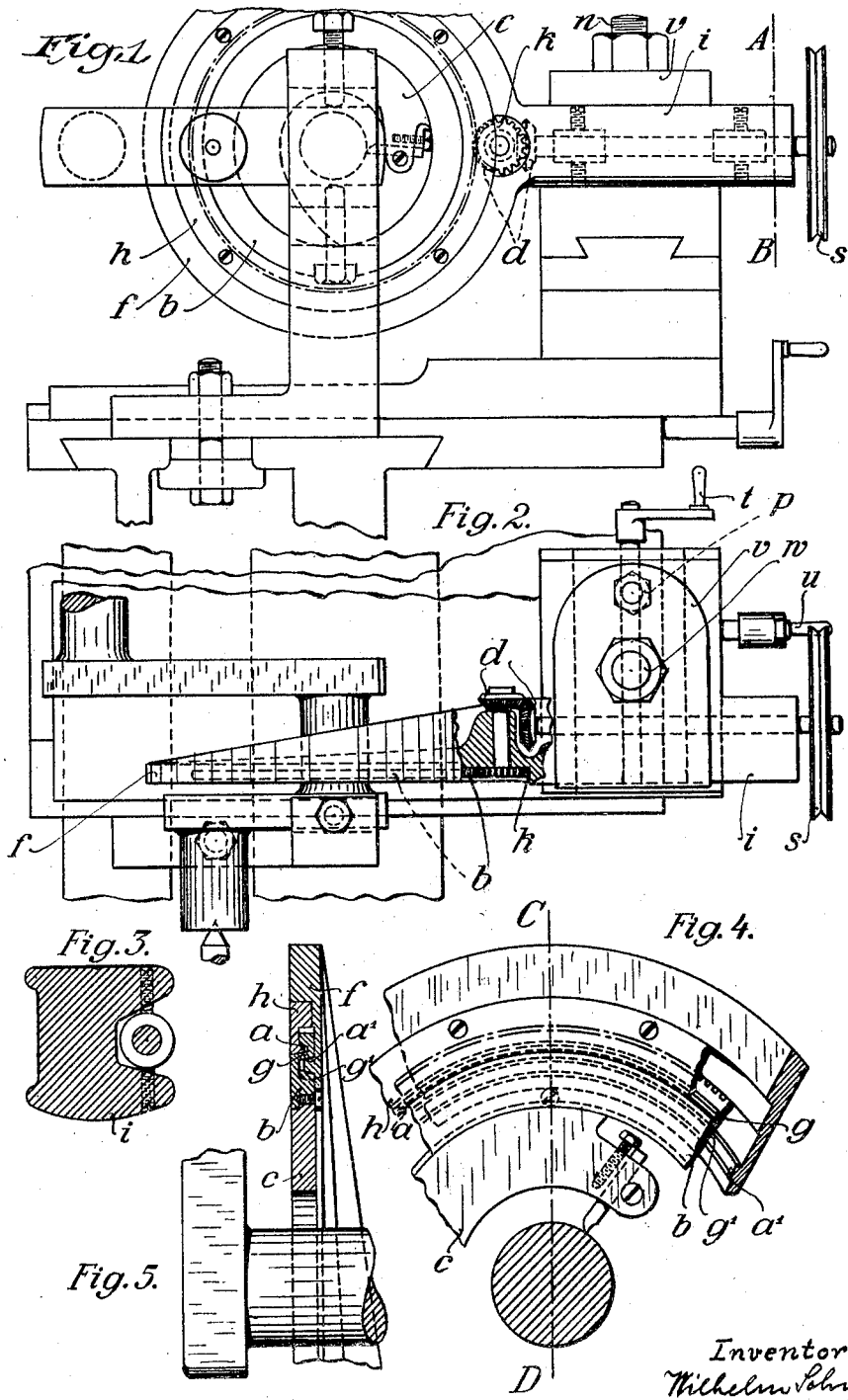

Patented Aug. 19, 1924.

1,505,167

UNITED STATES PATENT OFFICE.

WILHELM SCHWEIZER, OF BASEL, SWITZERLAND.

DEVICE FOR EQUALIZING CRANK PIVOTS.

Application filed October 23, 1922. Serial No. 596,427.

*To all whom it may concern:*

Be it known that I, WILHELM SCHWEIZER, a citizen of the Swiss Republic, and a resident of Basel, Switzerland, have invented a new and useful Device for Equalizing Crank Pivots, of which the following is a specification.

This invention relates to crank pivot equalizing devices of the kind in which a crescent-shaped tool holder is supported with the mediation of balls, in a circular guide having a rack. The holder or support, and, thus, the tool, is driven by a bevel-wheel gearing, one member of which meshes with said rack. Supporting the holder by the mediation of balls entails drawbacks, of which the most hurtful one consists in a lessening of the exactness of the guiding of the tool holder, especially if a lateral pressure arises, as is the case, for instance, in the equalizing of the grooves or furrows of crank pivots. Besides, employing a ball bearing necessitates making the circular guide comparatively very broad, whereby, however, the accessibility of the tool from the one or the other direction is impaired.

The present invention overcomes the several drawbacks by supporting the carrier of the tool holder at its two sides in prismatic guides, one of these guides being provided at the circular guide itself, the other at a concentric ring inserted into said guide and fastened to it by screws. The carrier of the tool is supported between these two prismatic guides and is, thus, securely and dependably guided between them, and, furthermore, no elastic yielding in the case of the steel being subjected to lateral pressure takes place.

Another improvement resides in the arm of the circular guide which serves for clamping the latter to the support being slightly curved at its bottom surface whereby it is made possible to adjust the equalizing device exactly vertically with respect to the turning lathe axis, and corresponding to the position of the fastening screw of the clamping claw, when drawing this screw fast. Washers may now be entirely dispensed with.

My invention is illustrated by way of example in the accompanying drawing, in which Figure 1 is a front view of the novel equalizing device, in connection with a portion of the lathe to which it is clamped. Figure 2 is a plan of the parts illustrated in Fig. 1; Figure 3 is a section in line A—B of Fig. 1; Figure 4 is a front view of some portions of the circular guide, viz, of the upper part of the lefthand half of Fig. 1, and drawn on a larger scale; and Figure 5 is a section in C—D of Fig. 4.

The tool holder $c$ and the annular carrier $b$ are detachably connected with each other. The carrier $b$ is provided on both sides with prismatic grooves $g$ and $g'$, of which $g$ receives a correspondingly shaped guide ledge $a$ forming a part of the circular guide member $f$, whereas the groove $g'$ receives a guide ledge $a'$ forming a part of a ring $h$ located in a correspondingly shaped recess of said guide member. The carrier $b$ of the tool holder $c$ has a cogged rim $b'$ which meshes with a cog-wheel $k$ driven by a bevel-wheel gearing $d$ driven in its turn by a rope-pulley $s$, the shaft of which is supported in the clamping arm $i$ and one of the bevel-wheels affixed to it.

$t$ and $u$ are the hand cranks for operating the slides holding the device which is clamped fast by the claw plate $v$ and the bolt $w$. Besides this bolt a smaller bolt $p$ is provided preventing any rotatory motion of the plate $v$ on the bolt $w$. The plate $v$ contacts with the upper flat surface of the arm $i$, the lower surface of which is slightly curved, as shown at $i'$ in Figure 1, whereby it is made possible to adjust the equalizing device exactly vertically with respect to the axis of the lathe.

Owing to the carrier $b$ being guided at both its sides by the prismatic ledges $a$ $a'$ and the grooves $g$ $g'$, it is held in a perfectly dependable manner without any back lash or play, and the thickness of the equalizing device need not be materially greater than the breadth of the tool holder, whereby it is made possible, when turning off the crank pin, to move the tool laterally in either direction so close to the ends of the crank pin that also the grooves are subjected to the equalizing operation.

Having now described my invention, what I desire to secure by a patent of the United States is:

1. A device for equalizing crank pins, comprising, in combination, a crescent-shaped tool holder; a circular carrier having said holder attached to it and having a circular groove on each side; a circular guide member located at one side of said carrier and having a circular ledge engaging the respective groove of the carrier; a ring located at the other side of the said carrier and being affixed to said guide member and having a circular ledge engaging the respective other groove of the carrier and means for rotating the tool carrier, as set forth.

2. A device for equalizing crank pins, comprising, in combination, a crescent-shaped tool holder; a circular carrier having said holder attached to it and having a circular groove on each side; a circular guide member located at one side of said carrier and having a circular ledge engaging the respective groove of the carrier; and a ring located at the other side of the said carrier and being affixed to said guide member and having a circular ledge engaging the respective other groove of the carrier; an arm extending laterally from the said guide member and having its lower surface curved and means for holding the said member by the mediation of said arm and means for rotating the tool carrier, substantially as set forth.

In testimony whereof I affix my signature in presence of two witnesses.

WILHELM SCHWEIZER.

Witnesses:
LUCIEN PICARD,
MADELEINE SPENGLER.